(12) United States Patent
Cohen et al.

(10) Patent No.: US 7,676,063 B2
(45) Date of Patent: Mar. 9, 2010

(54) SYSTEM AND METHOD FOR EYE-TRACKING AND BLINK DETECTION

(75) Inventors: Michael Cohen, Seattle, WA (US); Jue Wang, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 1387 days.

(21) Appl. No.: 11/087,281

(22) Filed: Mar. 22, 2005

(65) Prior Publication Data
US 2006/0215017 A1    Sep. 28, 2006

(51) Int. Cl.
*G06K 9/00* (2006.01)
(52) U.S. Cl. .................. 382/103; 382/100; 382/117; 382/118; 382/170
(58) Field of Classification Search .......... 382/100, 382/103, 117, 168–172
See application file for complete search history.

(56) References Cited

U.S. PATENT DOCUMENTS

| | | | | |
|---|---|---|---|---|
| 5,878,156 A * | 3/1999 | Okumura | ............ | 382/118 |
| 5,926,251 A * | 7/1999 | Okumura | ............ | 351/209 |
| 5,982,945 A * | 11/1999 | Neff et al. | ............ | 382/271 |
| 5,990,901 A * | 11/1999 | Lawton et al. | ............ | 345/581 |
| 6,430,306 B2 * | 8/2002 | Slocum et al. | ............ | 382/118 |
| 6,539,107 B1 * | 3/2003 | Michael et al. | ............ | 382/154 |
| 6,640,008 B1 * | 10/2003 | Lee et al. | ............ | 382/218 |
| 6,766,045 B2 * | 7/2004 | Slepyan et al. | ............ | 382/135 |
| 6,920,237 B2 * | 7/2005 | Chen et al. | ............ | 382/117 |
| 7,043,056 B2 * | 5/2006 | Edwards et al. | ............ | 382/103 |
| 7,197,165 B2 * | 3/2007 | Ryan | ............ | 382/103 |
| 2004/0179716 A1 * | 9/2004 | Tafuku et al. | ............ | 382/103 |
| 2004/0213437 A1 * | 10/2004 | Howard et al. | ............ | 382/115 |

OTHER PUBLICATIONS

Co-pending U.S. Appl.No. 11/087,221, "System and method for very low frame rate video streaming for face-to-face video conferencing," filed Mar. 22, 2005.
Co-pending U.S. Appl. No. 11/087,355, "System and method for very low frame rate teleconferencing employing image cropping and morphing," filed Mar. 22, 2005.
Beier, T., S. Neely, Feature-based image metamorphosis, *Computer Graphics*, 1992, vol. 26, No. 2, pp. 35-42.
Côté, G., B. Erol, M. Gallant and F. Kossentini, 263+: Video coding at low bit rates, *IEEE Trans. on Circuits and Systems for Video Tech.*, 1998, vol. 8, No. 7, pp. 849-866.
Crowley, J. L., F. Berard, Multi-modal tracking of faces for video communication, *Proc. IEEE Conf. Comp. Vision and Pattern Recog.*, 1997, pp. 640-645.

(Continued)

*Primary Examiner*—Bhavesh M Mehta
*Assistant Examiner*—Eric Rush
(74) *Attorney, Agent, or Firm*—Lyon & Harr LLP; Katrina A. Lyon

(57) ABSTRACT

A real-time low frame-rate video compression system and method that allows the user to perform face-to-face communication through an extremely low bandwidth network. The system and method employs novel eye tracking and blink detection techniques in order to select images for transmission. Experimental results show that the system is superior to more traditional video codecs for low bit-rate face-to-face communication.

12 Claims, 11 Drawing Sheets
(4 of 11 Drawing Sheet(s) Filed in Color)

OTHER PUBLICATIONS

Garau, M., M. Slater, S. Bee, M. A. Sasse, The impact for eye gaze on communication using humanoid avatars, *Proc. SIGCHI Conf. Human Factors in Computing Systems*, 2001, pp. 309-316.

Li, S. Z., X Zou, Y. Hu, Z. Zhang, S. Yan, X. Peng, L. Huang, H. Zhang, Real-time multi-view face detection, tracking, pose estimation, alignment, and recognition, 2001.

Vieux, W. E., K. Schwerdt, J. L. Crowley, Face-tracking and coding for video compression, *Proc. Int. Conf. Computer Vision Systems*, 1999, pp. 151-160.

Wen, Z., Z. Liu, M. Cohen, J. Li, K. Zhang, T. Huang, Low bit-rate video streaming for face-to-face teleconference, *IEEE Int'l. Conf. on Multimedia and Expo, ICME '04*, 2004, vol. 3., pp. 1631-1634.

\* cited by examiner

SYSTEM AND METHOD FOR EYE-TRACKING AND BLINK DETECTION

BACKGROUND

1. Technical Field

The invention is related to video conferencing, and in particular, to a system and method for very low frame rate video streaming for face-to-face videoconferencing that employs novel eye tracking and blink detection techniques.

2. Related Art

Face-to-face video communication is a potentially important component of real time communication systems. Inexpensive cameras connected to devices ranging from desktop computers to cell phones enable video conferencing in a variety of modes such as one-to-one and multi-party conferences.

Most video teleconference solutions are specifically designed for broadband networks and cannot be applied to low bandwidth networks. Previous face video compression techniques are not able to efficiently operate at very low bit rates because they compress and transmit the entirety of every video frame. Thus, reducing the bandwidth will of necessity degrade the image in every frame. There is a minimum for the allocated bits for each frame below which conventional compression techniques cannot produce visually acceptable results. Multi-party video conferences put an added strain on bandwidth requirements since multiple video streams need to be simultaneously transmitted in order for all of the participants to participate.

Different approaches have been proposed to reduce the bandwidth requirements for streaming video, such as the MPEG-4 face animation standard and H. 26x video coding [1]. By taking advantage of face models, the MPEG-4 face animation standard can achieve a high compression ratio by sending only face model parameters. However, it is difficult to make the synthesized faces look natural and match the original video. H.26x waveform-based coding techniques are fully automatic and robust, but are not efficient for low bit-rate face video since their generality does not take advantage of any face models. These two types of techniques are combined together in a recently proposed low bit-rate face video streaming system [2], where prior knowledge about faces are incorporated into traditional waveform-based compression techniques to achieve better compression performance. This system is, however, not able to operate efficiently at very low bit rates (e.g., on the order of 8 kb/s).

Therefore, what is needed is a system and method that can provide face-to-face video conferencing at very low bit rates with natural looking results. Additionally, this system and method should be able to provide face-to-face video conferencing in real time.

SUMMARY

A very low bit rate video conferencing system and method that includes a novel system and process for tracking eyes and detecting eye blinks. Eye templates for a person depicted in a video frame are created. The eye templates are made by manually indicating the pupil positions on the first frame of the video sequence in which the person is depicted with wide open eyes; and extracting two image patches at the pupil positions as templates, one for each eye. Then a sequence of video frames at least some of which contain image frames of the person are captured or input. A face detector is used to scan in the neighborhood of the face location in a previous frame to find a face box which surrounds the face of the person. If a face box is found the upper part of the face box is searched for eyes using the eye templates and feature based matching wherein image patches for each frame in the video sequence image patches are extracted and compared to the eye templates. The feature based matching involves computing a grayscale image corresponding to the image patch and creating horizontal and vertical edge maps for this image patch. Columns of pixels for the grayscale image itself and the vertical edge map are summed to project the image patch into two one dimensional (1D) signals. Then the rows of pixels of the grayscale image for the horizontal edge map are summed to project the image patch to produce another one 1D signal. The similarity between the eye template and the image patch are computed as the weighted sum of the correlations between corresponding 1D signals. Eye closing is detected when the correlation values drop for a given frame drops below a given threshold.

It is noted that in this section and the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

DESCRIPTION OF THE DRAWINGS

The file of this patent or application contains at least one drawing executed in color. Copies of this patent or patent application publication with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 7(*b*) and (*c*) show face tracking and eye blink detection examples. Red boxes are face tracking box and green boxes are cropping windows. Blue dots in (b) indicate detected open eyes and the absence of blue dots in (c) indicates closed eyes.

FIGS. 10(a) and (d) depict the first and the second decoded good faces. FIGS. 10(b) and (c) depict two synthesized intermediate faces created by image morphing and cross dissolving. FIGS. 10(e) and (f) depict two synthesized intermediate faces created only by cross dissolving.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
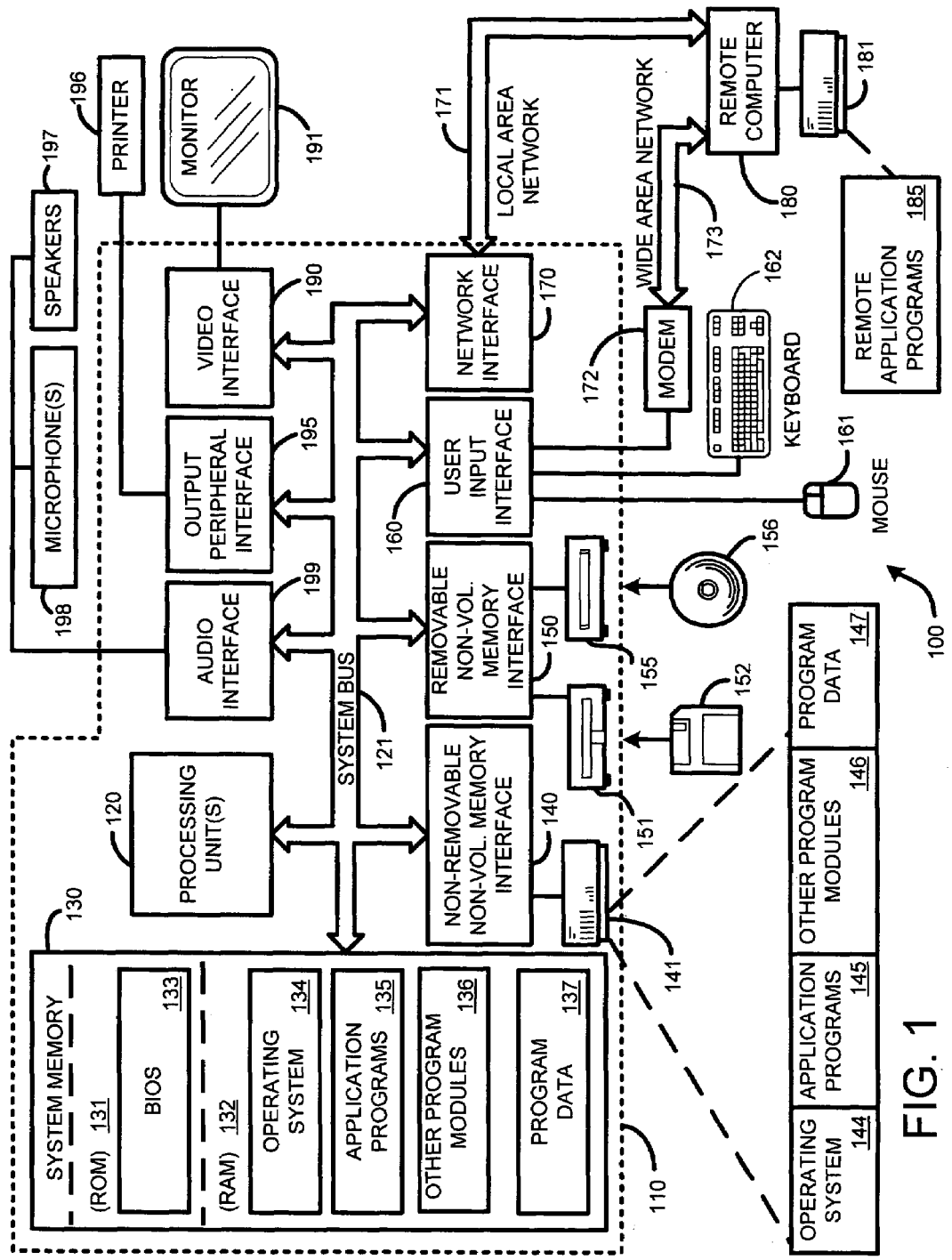
FIG. 1 is a general system diagram depicting a general-purpose computing device constituting an exemplary system wherein the very low bit rate video conferencing system and method of the invention can be practiced.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the very low bit rate video conferencing system and method of the invention.

2.0 The Very Low Bit Rate Video Conferencing System and Method:

The very low bit rate video conferencing system and method can be used individually in very low bandwidth networks, or as a complement to existing video conferencing systems. In a teleconference involving a group of people, each person's face will be captured and transmitted to others. Since there is generally only one speaker at a time, the very low bit rate video conferencing system and method can transmit the face of the speaker with a higher frame-rate, high quality video while transmitting all the listeners using low frame-rate video to save overall network bandwidth.

The following paragraphs discuss the details of the very low bit rate video conferencing system and method of the invention.

2.1 The Encoder

Figure 2:
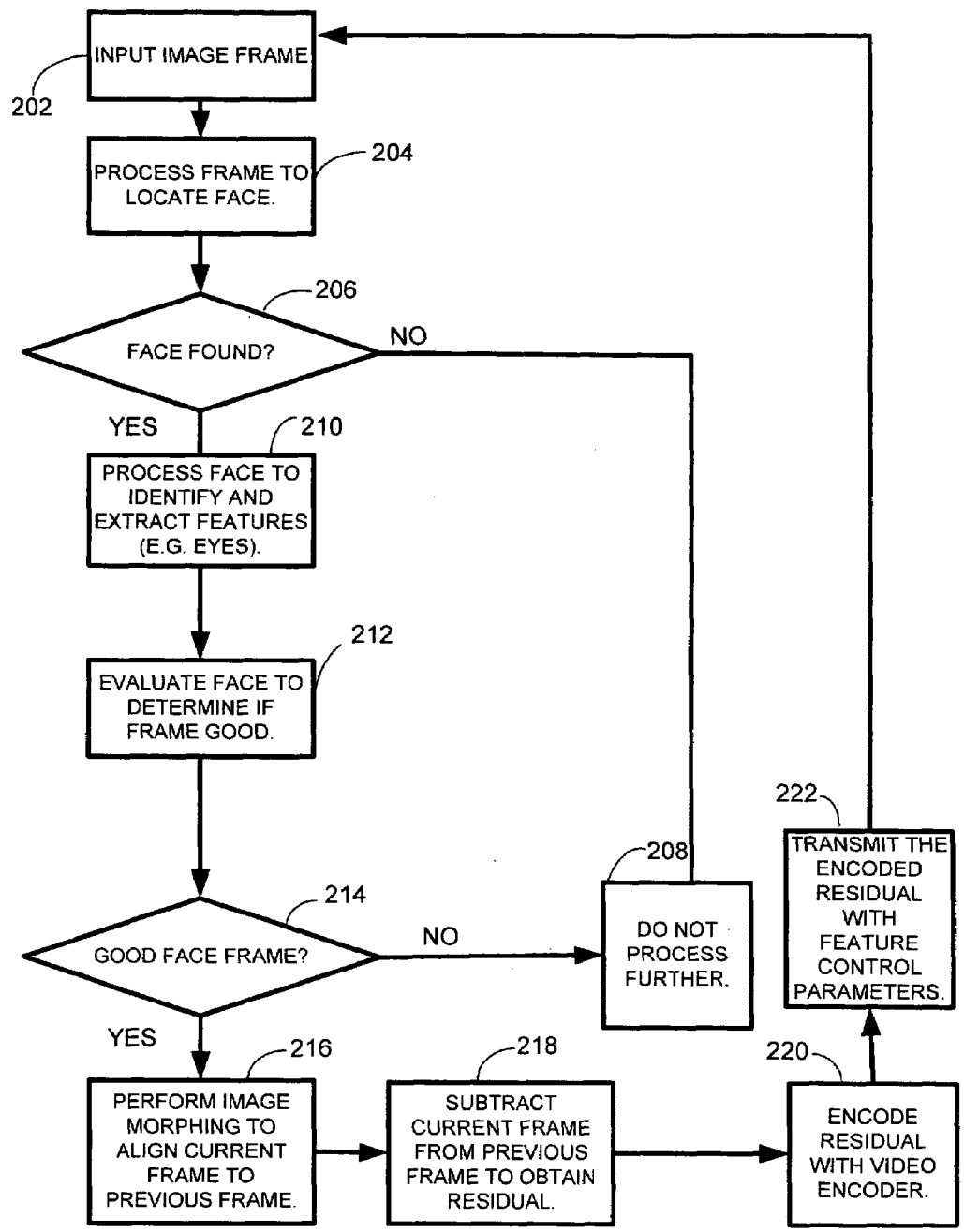
FIG. 2 illustrates an exemplary flow diagram of the encoding of the very low bit rate video conferencing system and method.

The encoding process of the very low bit rate video conferencing system and method is shown in FIG. 2. A video frame is input, as shown in process action 202. The input video frame is first processed to locate the face (process action 204). If no face is found, the very low bit rate video conferencing system and method does not process this frame any further (process actions 206, 208). If a face is found the very low bit rate video conferencing system and method tracks the positions of the eyes to be used both for face evaluation and motion compensation (process actions 206, 210). The face and eye tracking, and face evaluation are described in detail in Section 3.0. The very low bit rate video conferencing system and method then evaluates the frame and decides whether or not it is a good one (process action 212, 214). If it is, a feature-based image morphing is performed to align this frame to the previously transmitted frame (process action 216). The current frame is subtracted from the previous frame (process action 218) and the residual is sent to a standard video encoder (process action 220). The low bit rate video conferencing system and method then transmits the compressed residual along with control parameters such as time stamps and face feature positions, as shown in process action 222.

2.2 The Decoder

Figure 3:
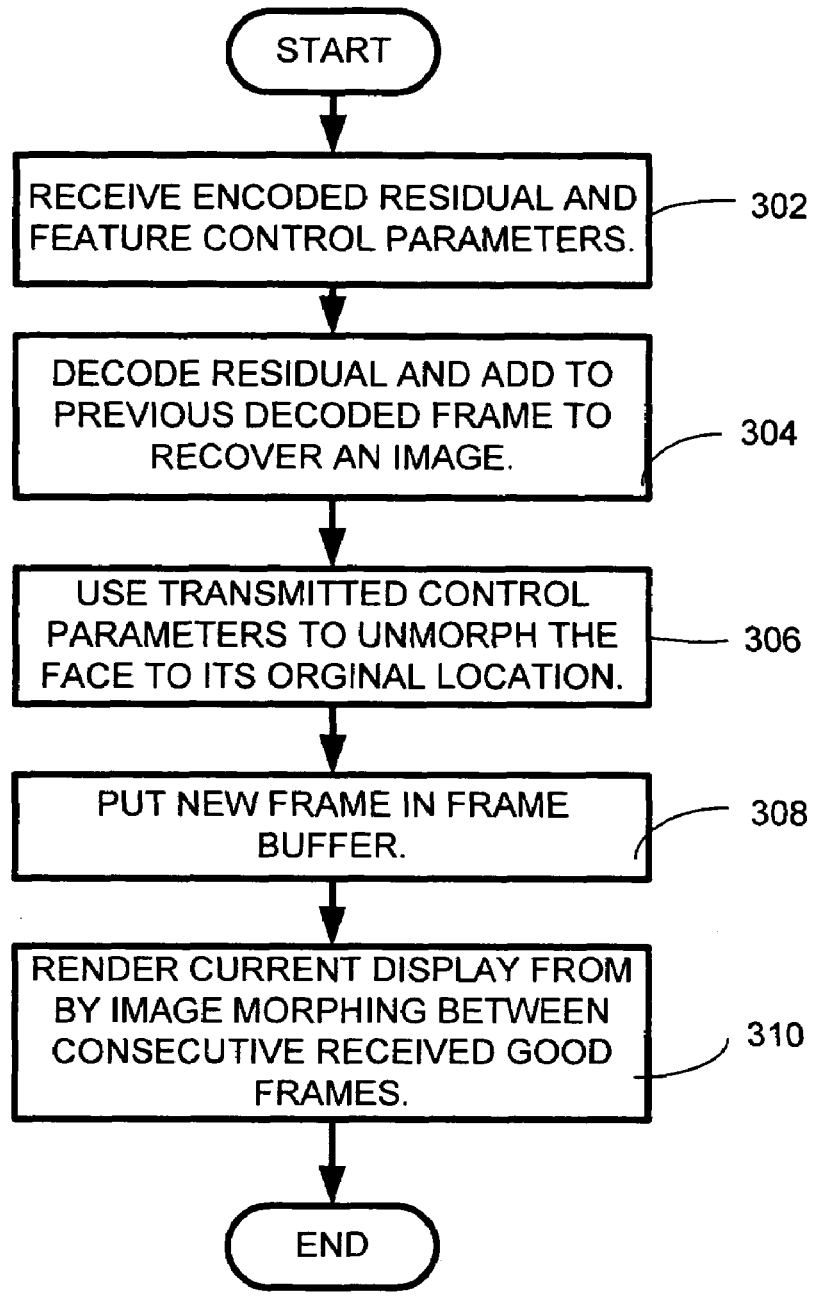
FIG. 3 illustrates an exemplary flow diagram of the decoding of the very low bit rate video conferencing system and method.

A flow chart of the decoding process of the low bit rate video conferencing system and method is shown in FIG. 3. The decoder receives the encoded residual, as shown in process in 302. The very low bit rate video conferencing system and method decodes the received residual and adds it to the previous decoded frame to recover the aligned image (process action 304). The transmitted control parameters are used to morph the face to its original location (process action 306). The new frame is put into the frame buffer (process action 308), and the current displayed frame is rendered by image morphing between consecutive received good frames (process action 310).

3.0 Finding Good Faces

Figure 4:
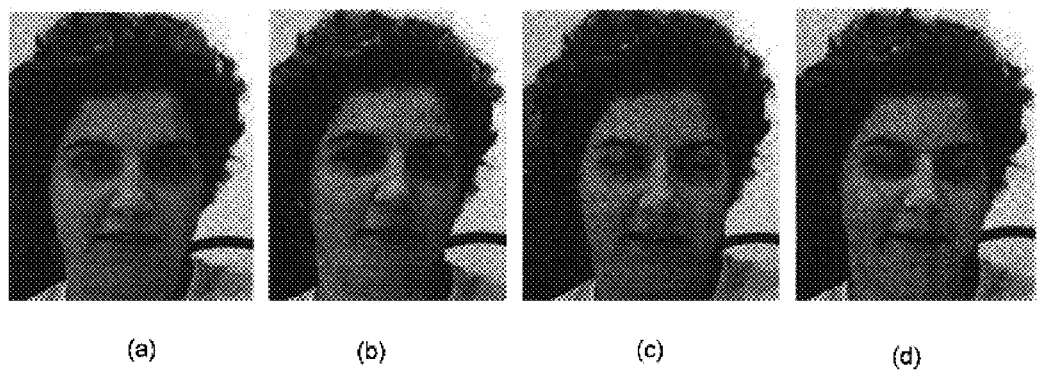
FIG. 4 shows examples of good faces (a and b) and not so good faces (c and d). Considering the importance of eye contact in face-to-face communication, the very low bit rate video conferencing system and method only transmits faces with open eyes.

The very low frame rate setting provides the freedom to choose which frame to transmit. For example, if the camera operates at 15 fps, but one wishes to transmit only one frame every 2 seconds, then one has up to 30 frames to choose from (however, in practice one may wish to limit the choice to minimize latency). Since each frame will be seen for 2 seconds, it becomes critical to select "good" frames. Choosing the specific features that distinguish a "good" frame from a "bad" one is somewhat objective. In an informal study many frames were examined and their quality was judged. It was originally hypothesized that some aspects of the eyes and mouth would correlate with the subjective judgment. In fact, only how open the eyes are had a significant correlation with "goodness." Examining FIG. 4, one sees a typical set of frames from a video sequence. The openness of the eyes decreases from (a) to (b) to (c) to (d) and so did the subjective of opinion about the "goodness" of the frames. This is consistent with psychological research results [3]. No other aspect of the face had a consistent impact. If one randomly selects frames to transmit, one will frequently encounter blinking, or half-blinking eyes, as shown if FIG. 4. To avoid such frames, the very low bit rate video conferencing system and method of the invention employs a face feature-based eye blink detection algorithm, which distinguishes between open and closed eyes.

3.1 Real-Time Eye Tracking.

Figure 6:
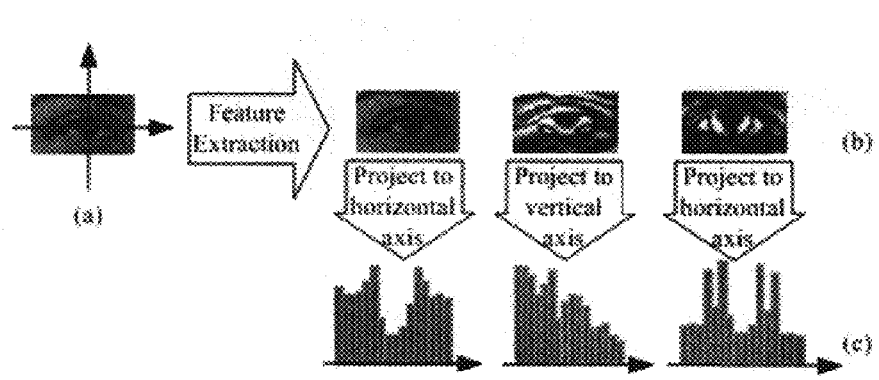
FIG. 6 depicts (a) An original left eye template; (b) Three feature patches computed from (a); From left to right: grayscale image, horizontal edge map and vertical edge map; and (c) Three 1D features are created by projecting the feature patches to horizontal or vertical axis.
Figure 5A:
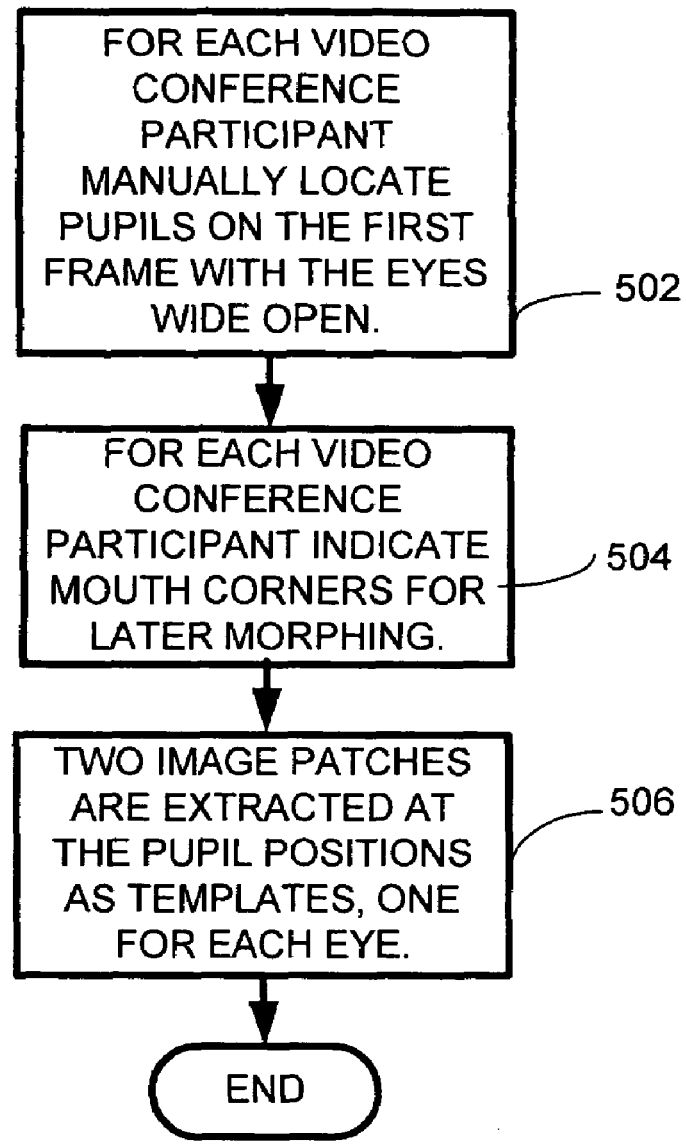
FIG. 5A illustrates an exemplary flow diagram of the creation of the eye templates employed by the very low bit rate video conferencing system and method.
Figure 5B:
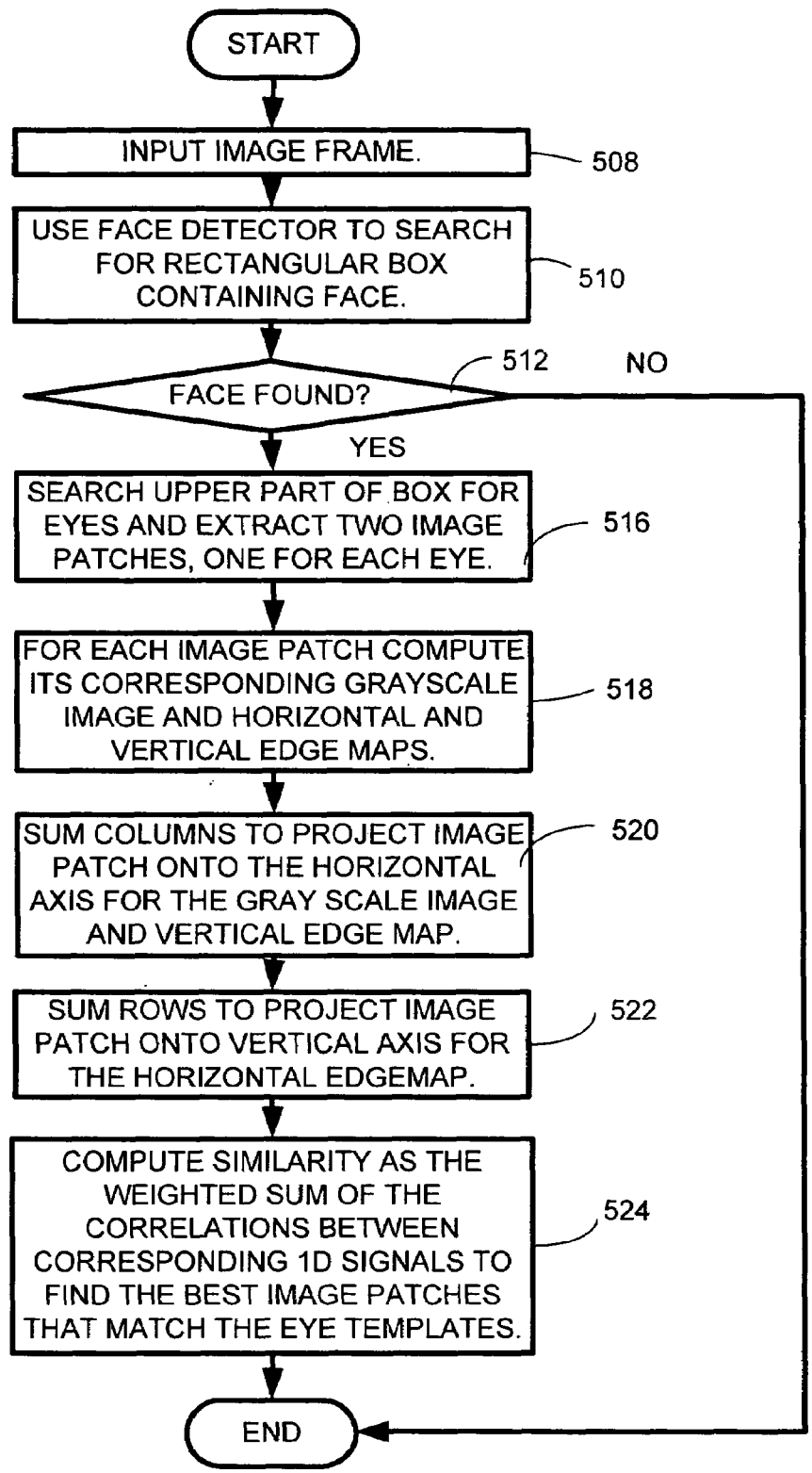
FIG. 5B illustrates an exemplary flow chart of the real-time eye tracking employed by the very low bit rate video conferencing system and method.

Face tracking has been extensively used for efficient face video compression [4, 5]. The very low bit rate video conferencing system and method begins with the efficient face detection algorithm proposed in [6] to locate a rectangular face box containing the face. For robustness, the low bit rate video conferencing system and method employs a template matching based method for both eye tracking and blink detection. For each video conference participant, the pupil positions are manually indicated on the first frame with wide open eyes (process action 502). The user is also asked to indicate the mouth corners for later morphing (process action 504). Two image patches are extracted at the pupil positions as templates, one for each eye, (process action 506), an example of which is shown in FIG. 6(a).

On each frame, the very low bit rate video conferencing system and method iteratively matches the templates to possible locations and select the best matching positions as the eye locations. For real-time detection and tracking, for each input frame (process action 508), the detector scans only in the neighborhood of the face location in the previous frame to find a face box (process action 510). If a face is not found, the face is no longer processed (process action 512). Given a face box is found, the very low bit rate video conferencing system and method searches the upper part of the box for eyes and extracts two image patches, one for each eye (process action 514). Eyes from different people or under different illumination conditions may have significantly different appearances. For efficiency and robustness to illumination changes, the very low bit rate video conferencing system and method uses image feature based matching instead of directly comparing image patches. As shown in FIG. 6(b), for an image patch, the very low bit rate video conferencing system and method computes its corresponding grayscale image, and horizontal and vertical edge maps created with Sobel filters (process action 516). By summing columns the low bit rate video conferencing system and method further projects the image patches to the horizontal axis (for the grayscale image and vertical edge map) or to the vertical axis by summing rows (for the horizontal edge map) to produce three 1D signals (process actions 518 and 520). The similarity between the eye template image patch and the extracted candidate image patch from the input frame is computed as the weighted sum of the correlations between corresponding 1D signals for each eye (process action 522). Mathematically, the three 1D signals for the left eye template $T_L$ are denoted as $G_i^{T_L}, i=1, \ldots, X_L$ (for grayscale image), $H_i^{T_L}, i=1, \ldots, Y_L$ (for horizontal edge map) and $V_i^{T_L}, i=1, \ldots, X_L$ (for vertical edge map), where $X_L$ and $Y_L$ are the width and height of the template. For a candidate image patch I, the three corresponding signals are denoted as $G_i^I$, $H_i^I$ and $V_i^I$. The correlation between the two image patches is computed as $$S_P(T_L, I) = w_G \cdot S(G^{T_L}, G^I) + w_H \cdot S(H^{T_L}, H^I) + w_V \cdot S(V^{T_L}, V^I) \quad (1)$$

where $w_G$, $w_H$ and $w_V$ are predefined weights. In one exemplary embodiment these predefined weights are set to be 0.4, 0.3 and 0.3, respectively.

S(A,B) is the signal correlation function computed as $$S(A, B) = \sum_{i=1}^{L} (a_i b_i) \bigg/ \sqrt{\sum_{i=1}^{L} a_i^2 \sum_{i=1}^{L} b_i^2} \quad (2)$$

where L is the length of the signal. Equation 2 describes the function on the right hand side of equation 1. In Equation 2, A and B are two arrays, $A = a_1, a_2, \ldots, a_L$, $B = b_1, b_2, \ldots, b_L$ where $a_i$ and $b_i$ are elements in the two arrays.

3.2 Eye Blink Detection

The advantage of template-matching based eye tracking is that it not only gives the best possible locations for the eyes, but also tells how well the templates match to these locations, indicated by the computed correlation values. Since the low bit rate video conferencing system and method uses open eyes as templates, when the eyes are blinking, the correlation values dropped significantly. FIG. 7(a) shows the maximum correlation values on matching the left eye template to each frame of an example video. More particularly, for each frame the correlation values are compared to a threshold. Blinks can be clearly seen at fairly regular intervals and they can be easily detected by applying a threshold on the correlation value computed from each frame. If the correlation values are greater than the threshold, the eyes are determined to be open. In one working embodiment of the very low bit rate video conferencing system and method of the invention the threshold is set to be 0.6.

Figure 7:
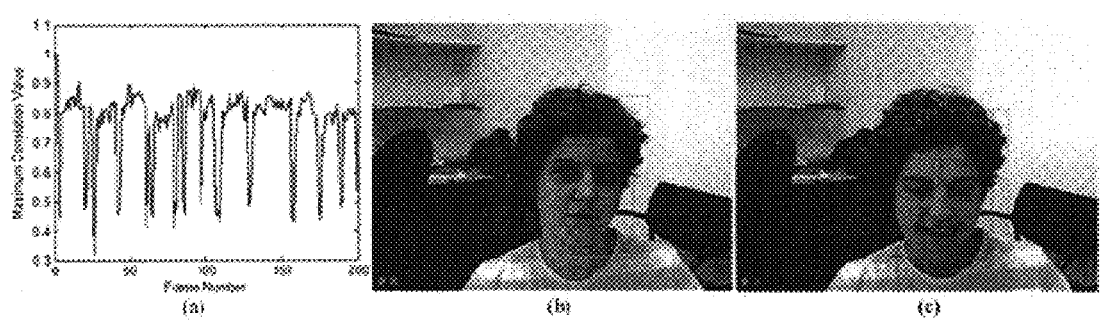
FIG. 7(*a*) depicts the maximum correlation values on matching the left eye template to each frame.

FIG. 7 shows some examples on face tracking and eye blink detection. The blue dots in FIG. 7(b) indicates open eyes detected by the system, while the absence of blue dots in FIG. 7(c) means that the system determines that the eyes are closed or half-closed.

3.3 Good Frame Selection.

Good frames for transmission are selected as follows. For each good frame $F_G^i$, there is a time stamp $t_G^i$. Good frames are selected from the original sequence based on the following criteria:

$$t_{min} \leq t_G^i - t_G^{i-1} \leq t_{max}, \quad (1)$$

where $t_{min}$ and $t_{max}$ are parameters determining how frequently one wants to pick out good frames and essentially, the frequency of the good frames determines the required bandwidth of the transmitted video. The variables $t_{min}$ and $t_{max}$ can be user defined.

(2) Both the face tracker and eye blink detector give positive results (e.g., the face-tracker gives a positive result when the frame contains a face and the eye blink detector gives a positive result when the eyes are open), which ensures the selected face has good visual quality (e.g., the eyes are open).

In cases that the user is temporally away from the camera, which means the second criterion cannot be satisfied, in on embodiment, the system sends a random frame every $t_{max}$ time to keep the transmitted video alive. More specifically, in the time interval $[t_{min}, t_{max}]$, the system will search for a frame which satisfies the two criteria. However, if none of the frames in this time interval satisfies the two criteria, the system will randomly choose one frame.

4.0 Compression and Rendering of Faces

4.1 Improved Motion Compensation

Selected good faces are compressed before transmission. The frames containing the good faces can be compressed using a standard video codec. Since the good faces are sparsely selected from the original video, the frame difference is typically larger than a high frame rate system making standard motion compensation less efficient. The face and eye tracking used to select frames can also inform the compression subsystem. First, by only transmitting the face region the very low bit rate video conferencing system and method avoids redundant transmission of the background. Second, the face tracking approximately aligns subsequent frames, significantly reducing the size of the interframe difference. Finally, by applying an image morph [7] that aligns the eye and mouth positions the difference between subsequent frames is further reduced. In one embodiment, the view area is limited to the area surrounding the head. However, it is also possible to send the background once or very infrequently.

Figure 8A:
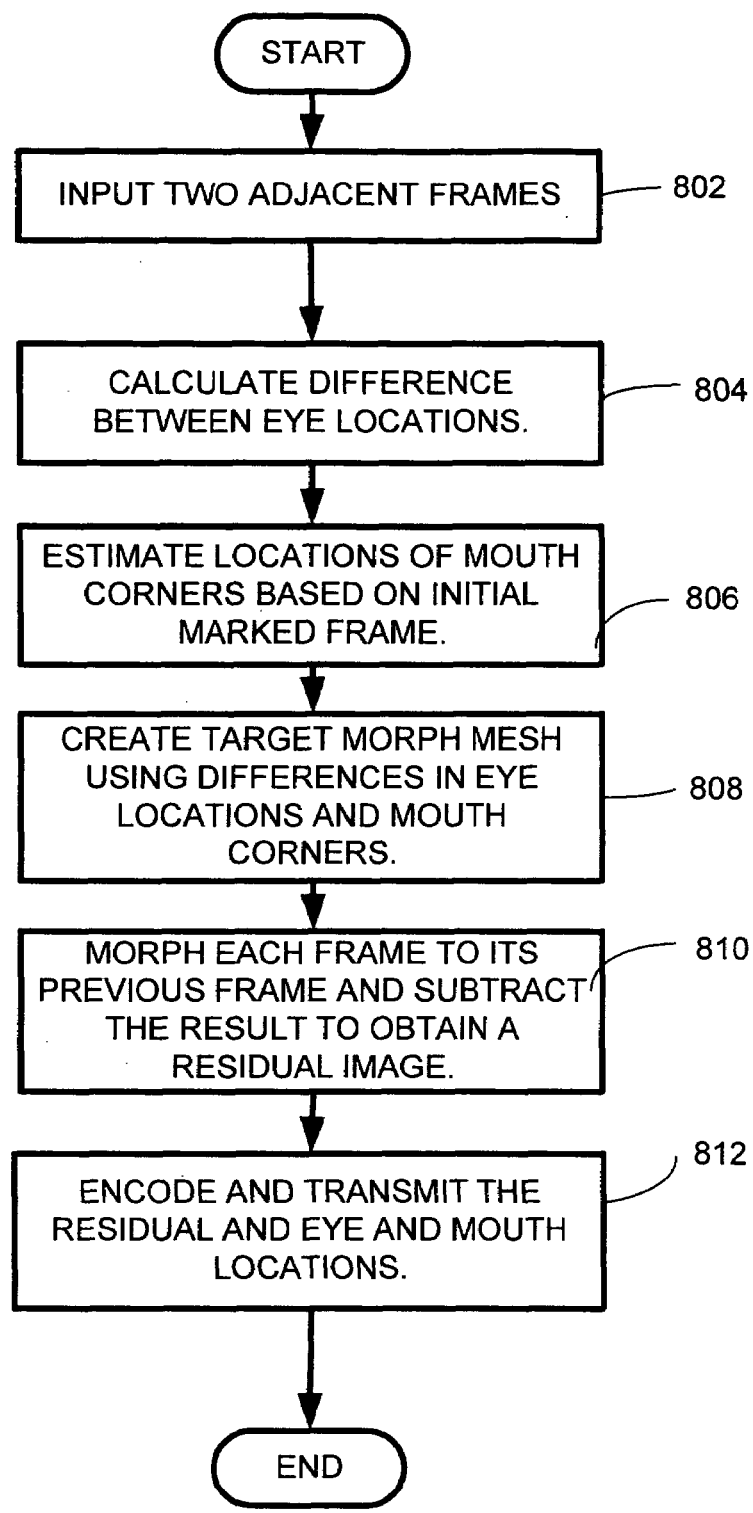
FIG. 8A illustrates an exemplary flow diagram of the image morphing employed in the very low bit rate video conferencing system and method.
Figure 8B:
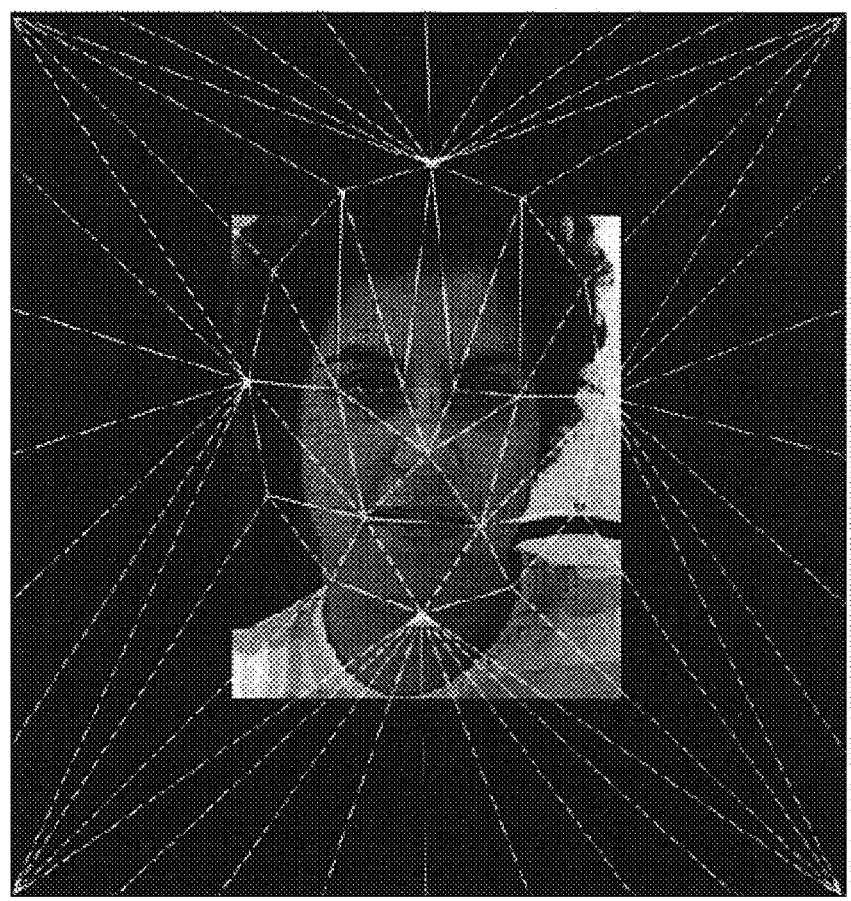
FIG. 8B depicts an exemplary morph mesh.

As shown in FIG. 8A, process actions 802 and 804, to compensate for motion between frames, the very low bit rate video conferencing system and method calculates the differences of eye locations between two adjacent frames, and estimates the location of the mouth corners based on the initial marked frame (process action 806). From this the very low bit rate video conferencing system and method creates a target morph mesh (process action 808) as in [7]. FIG. 8B depicts a morph mesh. To build the mesh, the image is segmented into attached triangle patches. By moving the positions of some vertices, a deformed mesh is created. The original image patches are mapped into the deformed triangles to get a deformed image. The very low bit rate video conferencing system and method morphs each frame to the immediately previously received frame and subtracts the result to obtain a residual image (process action 810). The morph is created by moving corresponding vertices (e.g., eye corners, mouth corners) to the positions from the last frame. The pixels within the triangles are carried along with the change in vertex positions using barycentric coordinates. In addition to coding the final residual the very low bit rate video conferencing system and method also transmits the eye and mouth locations so the process can be decoded (process action 812).

4.2 Image Morphing for Rendering.

Figure 9:
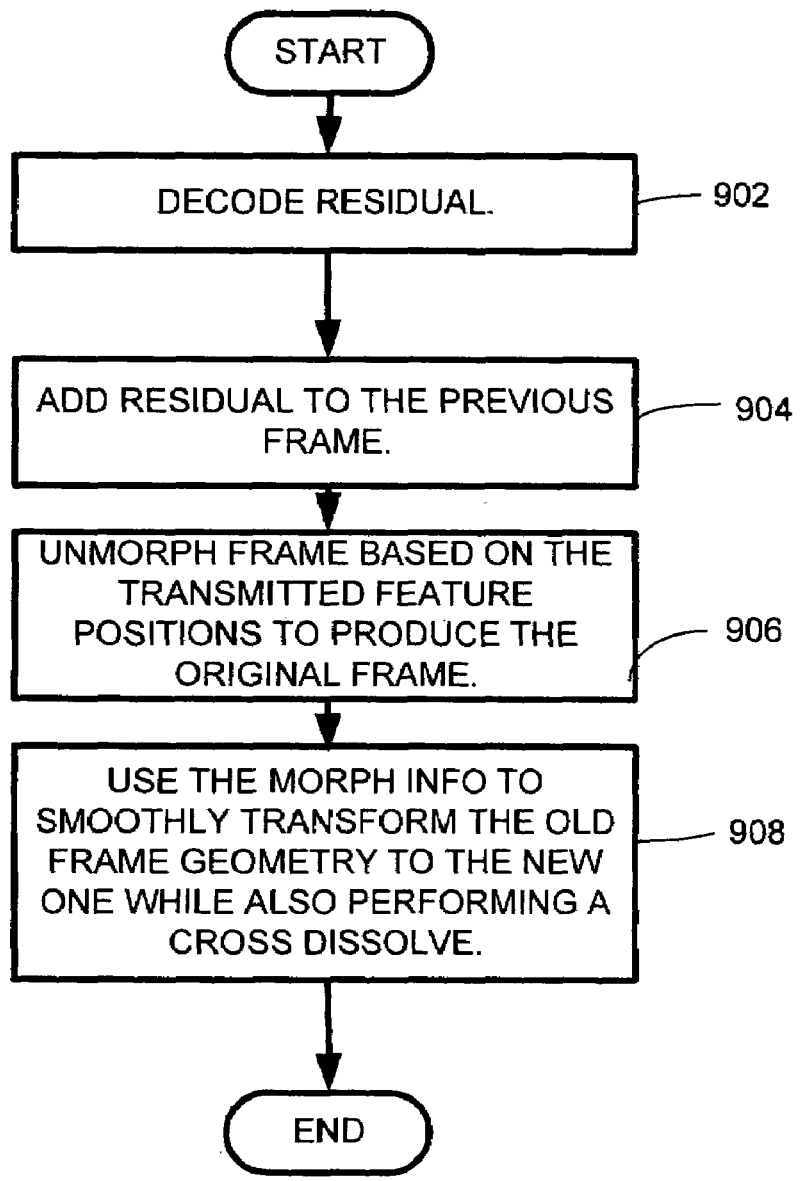
FIG. 9 illustrates an exemplary flow diagram of the image morphing for rendering employed in the very low bit rate video conferencing system and method.

As shown in FIG. 9, the decoder performs the opposite operations. The residual is decoded (process action 902) and added to the previous frame (process action 904). This new frame is then unmorphed based on the transmitted feature positions to reproduce the most current frame (process action 906). One now has the option of simply switching from the old frame to the new one. However, this would produce a jump in the viewed video. To avoid a jarring jump, one can cross dissolve from the old to new but this produces ghostlike blurry images in the transition, as shown in FIGS. 10(e) and (f). A better solution is to use the morph information to smoothly transform the old frame geometry to the new one while also performing the cross dissolve as was done in [7]. In more detail, we may wish to smoothly morph from frame t to frame t+5 with images I(t) and I(t+5) and with sets of feature points F(t) and F(t+5). To create an in-between frame I(t+2) from these two frames, we first linear interpolate F(t) and F(t+5) to get F(t+2). (The assumption is F(t) and F(t+5) is the same set of feature points with different locations). Then we morph I(t) to $I_a$(t+2) based on F(t) and F(t+2), and morph I(t+5) to $I_b$(t+2) based on F(t+5) and F(t+2). The final image is created by $$I(t+2) = \frac{3}{5} \cdot I_a(t+2) + \frac{2}{5} \cdot I_b(t+2).$$

Figure 10:
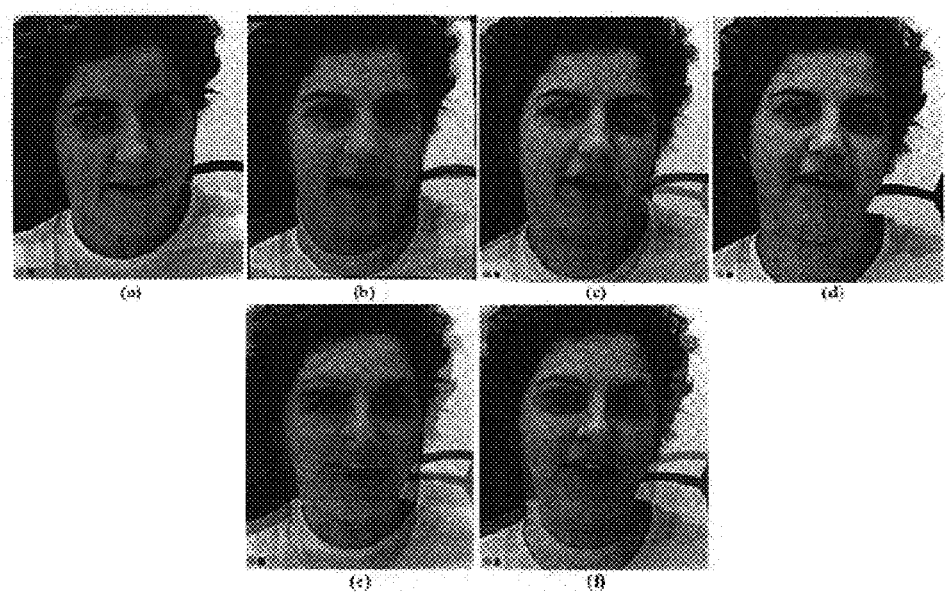
FIG. 10 depicts examples of morphing-based rendering.

In this way one can create a new video in the same frame-rate as the original video captured at the encoder (process action 1000). FIG. 10 shows two decoded frames and the synthesized intermediate frames.

5.0 Results

5.1 Good Face Finding.

Figure 11:
FIG. 11 shows Top: 5 out of 30 frames in the final video with good frame selection. Bottom: the corresponding set of frames in the final video without good frame selection. It clearly suggests that image morphing is very useful to achieve a better motion compensation in low frame-rate case.

As can be seen in FIG. 11, the very low bit rate video conferencing system and method is able to select only good frames to transmit. The figure shows 5 of 30 frames selected for transmission using the good frame selection criteria and by simply regularly sampling the video. The other 25 frames all looked good both with and without the selection criteria. It clearly shows that by using good frame selection, the transmitted video looks more natural, and facilitates important social-cognitive effects.

5.2 Compression.

Table 1 shows the compression result of the system on a sample video with different settings of $t_{min}$ and $t_{max}$, which control the desired frame rate. Note that the very low bit rate video conferencing system and method only requires a very low bit-rate to transmit a semi-alive video. The last row of the table shows the compression result of the codec of the very low bit rate video conferencing system and method without using image morphing.

TABLE 1

Compression results of the low frame-rate system

| Codec | Configurations | Bit-Rate |
| --- | --- | --- |
| MPEG 2 | 640*480, 30f/s, good quality | 322Kb/s |
| H.264 | 640*480, 30f/s, lowest quality | 12.4Kb/2 |
| Low-frame rate | 240*280, $t_{min}$ = 1, $t_{max}$ = 3 | 7.4Kb/s |
| Low-frame rate | 240*280, $t_{min}$ = 2, $t_{max}$ = 4 | 3.8Kb/s |

TABLE 1-continued

Compression results of the low frame-rate system

| Codec | Configurations | Bit-Rate |
|---|---|---|
| Low-frame rate w/o morphing | 240*280, $t_{min} = 2$, $t_{max} = 4$ | 5.4Kb/s |

Figure 12:
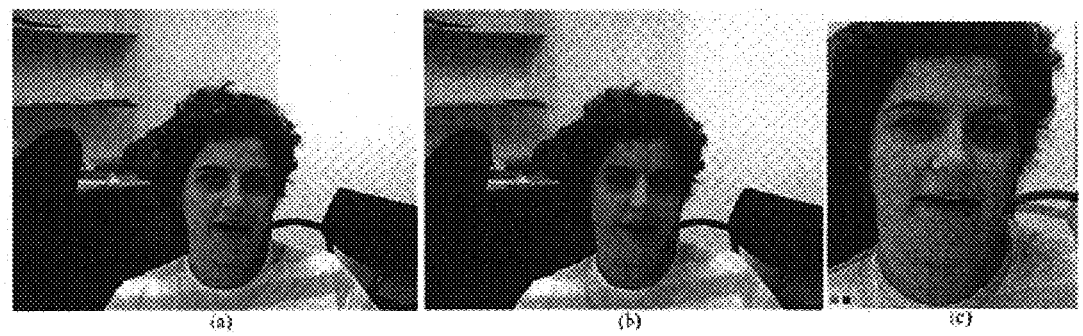
FIG. 12 depicts (a) One example frame. (b) Compressed by H.264 video codec (off-line) with a limited bit-rate at 12.4 Kb/S. Note that the visual quality of face is poor. (c) Using low frame-rate compression system, the very low bit rate video conferencing system and method uses only ⅓ bandwidth of dial-up connection to transmit high quality faces that look alive.

H.264 also achieves a low bit-rate compression, but the visual quality of the compressed video is significantly worse spatially, as shown in FIG. 12. However, to be fair, it should be noted that the increased temporal frame rate does help depict a person's motion better. Further user studies will be needed to fairly examine the trade-offs. Informally, the very low bit rate video conferencing system and method provides a better experience at a lower bit rate for viewing listeners, but may lose some important semantic meaning in the motion of speakers to maintain the better visual quality and lower bit rate. More importantly, the very low bit rate video conferencing system and method performs the face/eye tracking and encoding in real-time as compared with the H.264 encoder which took about 30 minutes to encode a ten second video. Also, the very low bit rate video conferencing system and method uses only about ⅓rd of the bandwidth of a slow dial-up line and thus is a good choice particularly when there are multiple participants in a video conference.

The foregoing description of the very low bit rate video conferencing system and method has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments. It is intended that the scope of the invention be limited not by this detailed description, but rather by the claims appended hereto.

REFERENCES

[1] G. Cote, B. Erol, M. Gallant, F. Kossentini. 263+: Video coding at low bit rates. IEEE Trans. Circuit and Systems for Video Technology, vol. 8, no. 7, 1998.
[2] Z. Wen, Z. C. Liu, M. Cohen, J. Li, K. Zheng, T. Huang. Low Bit-rate Video Streaming for Face-to-face Teleconference. In Proc. IEEE Int. Conf. Multimedia and Expo, 2004.
[3] M. Garau, M. Slater, S. Bee, M. A. Sasse. The impact of eye gaze on communication using humanoid avatars. In Proc. SIGCHI Conf. Human factors in computing systems, 2001.
[4] W. Vieux, K. Schwerdt, J. Crowley. Facetracking and coding for video compression In Proc. of the First Int. Conf. on Computer Vision Systems, 1999.
[5] J. Crowley, F. Berard. Multi-modal tracking of faces for video communication. In Proc. IEEE Conf. Computer Vision and Patt. Recog, 1997.
[6] S. Z. Li, X. L. Zou, et al. Real-time multi-view face detection, tracking, pose estimation, alignment, and recognition. In IEEE CVPR Demo Summary, 2001.
[7] T. Beier, S. Neely. Feature-Based Image Metamorphosis. Computer Graphics, 26(2), 1992.

What is claimed is:

1. A process for tracking eyes and detecting eye blinks, comprising the process actions of:
using a computing device for,
defining eye templates for a person depicted in a video frame;
inputting a video frame of the person's face;
using a face detector to find a face box which surrounds the face of the person;
searching the upper part of the face box for eyes using feature based matching to match image patches for each eye in the video frame to the eye templates to locate the eyes, wherein the feature based matching comprises the process actions of:
for each image patch,
computing a grayscale image corresponding to the image patch;
creating horizontal and vertical edge maps of the image patch;
summing columns of pixels for the grayscale image and the vertical edge map to project the image patch to the horizontal axis to create two one dimensional (1D) signals;
summing rows of pixels for the horizontal edge map to project the image patch to the vertical axis to produce one 1D signal; and
computing the similarity between the eye template and the image patch as a weighted sum of the correlations between corresponding 1D signals, wherein the similarity is determined by a signal correlation function S(A,B) of $$S(A, B) = \sum_{i=1}^{L} (a_i b_i) \bigg/ \sqrt{\sum_{i=1}^{L} a_i^2 \sum_{i=1}^{L} b_i^2}$$

where L is the length of the signal and signals A and B are two arrays, $A=a_1, a_2, \ldots, a_L$, $B=b_1, b_2, \ldots, b_L$ where $a_i$ and $b_i$ are elements in the two arrays.

2. The process of claim 1 wherein the three 1D signals for the left eye template $T_L$ are denoted as $G_i^{T_L}, i=1, \ldots, X_L$ for the grayscale image, $H_i^{T_L}, i=1, \ldots, Y_L$ for the horizontal edge map, and $V_i^{T_L}, i=1, \ldots, X_L$ for the vertical edge map, and where $X_L$ and $Y_L$ are the width and height of the template, for a candidate image patch I, three corresponding signals are denoted as $G_i^I, H_i^I$ and $V_i^I$ and the correlation $S(T_L,I)$ between the two image patches is computed as $$S(T_L,I) = w_G \cdot S(G^{T_L}, G^I) + w_H \cdot S(H^{T_L}, H^I) + w_V \cdot S(V^{T_L}, V^I)$$

where $w_G$, $w_H$ and $w_v$ are predefined weights.

3. The process of claim 1 wherein the three 1D signals for the right eye template $T_R$ are denoted as $G_i^{T_L}, i=1, \ldots, X_R$ for the grayscale image, $H_i^{T_L}, i=1, \ldots, Y_R$ for the horizontal edge map, and $V_i^{T_L}, i=1, \ldots, X_R$ for the vertical edge map, and where $X_R$ and $Y_R$ are the width and height of the template, for a candidate image patch I, three corresponding signals are denoted as $G_i^I, H_i^I$ and $V_i^I$ and the correlation $S(T_R,I)$ between the two image patches is computed as $$S(T_R,I) = w_G \cdot S(G^{T_R}, G^I) + w_H \cdot S(H^{T_R}, H^I) + w_V \cdot S(V^{T_R}, V^I)$$

where $w_G$, $w_H$ and $w_v$ are predefined weights.

4. The process of claim 1 wherein defining an eye template comprises the process actions of:
manually indicating the pupil positions on the first frame of the video sequence in which the person is depicted with wide open eyes; and
extracting two image patches at the pupil positions as templates, one for each eye.

5. The process of claim 1 wherein said face detector only scans in the neighborhood of the face location in a previous frame to find the face box.

6. The process of claim 1 wherein blinking is detected when the correlation values drop significantly.

7. The process of claim 3 wherein eye closing is detected when the correlation values for a given frame drop below a given threshold.

8. The process of claim 7 wherein the threshold is set to be 0.6.

9. A computer-readable storage medium having computer-executable instructions stored thereon for performing the process recited in claim 1.

10. A system for detecting eye blinks, comprising:
a general purpose computing device; and
a computer program comprising program modules executable by the computing device, wherein the computing device is directed by the program modules of the computer program to,
define eye templates for a person depicted in a video frame;
input a sequence of video frames at least some of which containing image frames of the person;
use a face detector to find a face;
if a face is found, search the face for eyes using said eye templates and feature based matching, wherein image patches for each frame in the video sequence are extracted and compared to the eye templates wherein the feature based matching comprises the sub-modules to:
for each extracted image patch,
compute a grayscale image corresponding to the image patch;
create horizontal and vertical edge maps of the image patch;
sum columns of pixels of the grayscale image and the vertical edge map to project the image patch to the horizontal axis to create two one dimensional (1D) signals;
sum rows of pixels for the horizontal edge map to project the image patch to the vertical axis to produce one 1D signal; and
compute the similarity between the eye template and the image patch as a weighted sum of the correlations between corresponding 1D signals, wherein the similarity is determined by a signal correlation function S(A,B) of $$S(A, B) = \sum_{i=1}^{L} (a_i b_i) \bigg/ \sqrt{\sum_{i=1}^{L} a_i^2 \sum_{i=1}^{L} b_i^2}$$

where L is the length of the signal and signals A and B are two arrays, $A=a_1, a_2, \ldots, a_L$, $B=b_1, b_2, \ldots, b_L$ where $a_i$ and $b_i$ are elements in the two arrays.

11. The system of claim 10 wherein the module to define eye templates comprises sub-modules to:
manually indicate the pupil positions on the first frame of the video sequence in which the person is depicted with wide open eyes; and
extract two image patches at the pupil positions as templates, one for each eye.

12. The system of claim 10 wherein blinking is detected when the correlation values drop significantly.

* * * * *